United States Patent [19]

Liechty et al.

[11] Patent Number: 5,592,740
[45] Date of Patent: Jan. 14, 1997

[54] PISTON RING METHOD

[75] Inventors: Deryll L. Liechty, Berne; James L. Geels, Decatur, both of Ind.

[73] Assignee: Micro Precision Operations, Inc., Berne, Ind.

[21] Appl. No.: 374,912

[22] Filed: Jan. 19, 1995

Related U.S. Application Data

[62] Division of Ser. No. 138,475, Oct. 15, 1993, Pat. No. 5,404,629.

[51] Int. Cl.⁶ ........................................................ B23Q 7/10
[52] U.S. Cl. ............................ 29/888.044; 29/222; 29/809
[58] Field of Search ................................ 29/791, 771, 783, 29/809, 222, 223, 224, 229, 235, 269, 450, 451, 453, 888.044; 221/221, 222, 296, 297, 298

[56] References Cited

U.S. PATENT DOCUMENTS

| | | | |
|---|---|---|---|
| 2,792,625 | 5/1957 | Hoffman | 29/222 |
| 4,047,276 | 9/1977 | Albers | 29/222 |
| 4,967,459 | 11/1990 | Garnier | 29/222 |
| 5,259,109 | 11/1993 | Fefeu et al. | 29/222 |
| 5,303,465 | 4/1994 | Fujimoto et al. | 29/791 |
| 5,404,629 | 4/1995 | Liechty et al. | |

FOREIGN PATENT DOCUMENTS

| | | |
|---|---|---|
| 0526329 | 2/1993 | European Pat. Off. . |
| 0559503 | 9/1993 | European Pat. Off. . |
| 58-120436 | 7/1983 | Japan . |
| 60201835 | 10/1985 | Japan . |
| 63-196329 | 8/1988 | Japan . |
| 2075745 | 3/1993 | Japan . |
| 2266574 | 11/1983 | United Kingdom . |

*Primary Examiner*—Robert C. Watson
*Attorney, Agent, or Firm*—Edward J. Timmer

[57] ABSTRACT

Method for assembling a piston ring in a circumferential groove of a piston wherein a plurality of ring nest members are disposed about a common axis for radial movement toward or away from the axis between radially contracted positions and radially expanded positions, The nest members collectively form a circular opening concentric with the axis and a ring-receiving recess concentric about the opening when they are in the contracted positions. The ring nest members are movable from the radially contracted to the expanded positions when the ring is expanded so as to collectively enlarge the opening for receiving the piston and the recess to maintain the expanded ring substantially concentric with the axis while the fixed axial dimension prevents "oil canning". A plurality of radially and axially movable ring expanding fingers are disposed about the axis and positionable in the opening for radially expanding the ring while it resides in the recess. The piston is moved into the enlarged opening along the axis in a manner that the ring expander fingers are moved axially out of engagement with the expanded ring in the enlarged recess while the piston groove is moved to receive the expanded ring from the recess.

5 Claims, 12 Drawing Sheets

PISTON RING METHOD

This is a division of Ser. No. 08/138,475, filed Oct. 15, 1993, now U.S. Pat. No. 5,404,629.

FIELD OF THE INVENTION

The present invention relates to piston-ringing apparatus for high volume assembly of rail rings or other rings in circumferential grooves of pistons for internal combustion engines.

BACKGROUND OF THE INVENTION

Internal combustion engine pistons typically have several rings positioned in respective circumferential grooves proximate the closed (domed) end of the piston. For example, a typical internal combustion engine piston will include an inner expander ring with so-called rail rings on opposite sides thereof in the same groove, an intermediate cast iron compression ring, and outer cast iron or steel compression ring proximate the closed (domed) end of the piston.

The compression rings typically are made of cast iron or steel and precision ground so as to be nearly perfectly flat and thus resistant (stiff) to bending out of a flat profile. Compression rings can be from 3 mm to 1 mm in thickness and have square or radiused inner diameters.

Expander rings, on the other hand, typically are made of stainless steel and include vertical and/or horizontal corrugations. Expander rings are relatively flimsy and easily bendable out of a flat profile as compared to compression rings during the assembly operation into the respective piston grooves. Expander rings can be from 5 mm to 2 mm in thickness.

Each corrugated expander ring typically is bounded or supported on each side in the same piston groove by what are called rail rings which are much thinner, spring steel rings. For example, the rail rings can typically have a thickness of 0.3 mm to 0.8 mm. The rail rings are adapted to wipe the cylinder wall of the internal combustion engine in a manner to provide a controllable thin oil lubricating layer thereon. As a result of their thinness and spring steel properties, the rail rings are prone to "oil-can" when radially expanded during assembly into the piston groove on opposite sides of the expander ring. "Oil canning" is a bowing of the thin rings into a two cycle wave (sinusoidal wave) type configuration when radially expanded during the ring-piston groove assembly operation.

This "oil canning" makes assembly of the thin rail rings onto the piston groove difficult and unreliable.

There is a need for piston ringing apparatus that can be used to assemble thin rail and similar rings onto internal combustion engine pistons at one or more piston ringing stations under high volume production conditions in a manner to avoid "oil canning" of the rings such that the rate and reliability of ring assembly on the pistons is much improved.

There also is a need for piston ringing apparatus that can be used to assemble thin rail and similar rings onto internal combustion engine pistons at one or more piston ringing stations and that can be further automated in a manner that improves the assembly rate and reliability of ring/piston assembly.

It is an object of the invention to satisfy these needs.

SUMMARY OF THE INVENTION

The present invention provides apparatus for assembling a piston ring, such as a rail ring or other ring (e.g. a compression ring), in a circumferential groove of an internal combustion engine piston wherein the apparatus comprises a plurality of ring nest members disposed about a common axis for radial movement toward or away from the axis between radially contracted positions and radially expanded positions. The ring nest members collectively form a circular opening concentric about the axis and a ring-receiving recess about the opening when they are in the contracted positions. The recess includes means for locating a radially unexpanded ring concentric about the axis. If necessary, for a particular ring (e.g. a rail ring) the recess includes a fixed axial dimension for preventing "oil canning" of the ring when it is expanded.

The ring nest members are movable from the radially contracted positions to the radially expanded positions when the ring is expanded so as to collectively enlarge the opening for receiving the piston and the ring-receiving recess for maintaining the expanded ring substantially concentric with the axis.

The apparatus includes a plurality of radially and axially movable ring expanding fingers disposed concentrically about the axis and positionable in the opening for radially expanding the ring while it resides in the first recess. Expansion of the ring in the recess effects radially outward movement of the ring nest members to the expanded positions where they collectively enlarge the opening and recess so that the expanded ring is maintained concentric with the axis and axially confined if necessary for a particular ring, to prevent "oil canning".

Preferably, cam means is provided for moving the ring expanding fingers radially outward to engage and expand the ring and the ring nest members such that the expanded ring resides in the enlarged recess concentric with the axis. The cam means is movable in a direction coaxial with the axis and relative to respective cammed surfaces of the ring expanding fingers to cause the fingers to radially expand in unison.

The ring expanding fingers are movable in an axial direction in response to piston movement along said common axis during the ring assembly operation to allow entry of the ring into the piston groove.

The apparatus includes means for moving the piston into the enlarged opening along the axis in a manner that the ring expanding fingers are moved axially out of opposing relation to the recess in response to piston movement and the piston groove is moved to a ring receiving position opposing the recess so as to allow the expanded ring to enter said piston groove from the recess.

In one embodiment of the invention, the plurality of ring nest members comprise four plate means disposed in respective quadrants about the axis and radially spring biased toward the axis to form the ring-receiving recess, whereby expansion of the ring in the recess causes the quadrant plate members to move from the contracted to the expanded positions to enlarge the opening for receiving the piston. Preferably, each quadrant plate means comprises first and second interconnected plates spaced apart along the axis to define the fixed axial dimension. The apparatus preferably further includes means for moving the ring nest members radially outward beyond the expanded positions so that the ringed piston can be readily removed.

In another embodiment of the invention, means for positioning a ring in the recess comprises a ring knife means comprising a first slide member reciprocable in a first direction from a starting position toward the recess and a second direction away from the recess back to the starting position. A second slide member is disposed on the first slide member for movement in a direction transverse to the first and second directions. A knife member is disposed on the second slide member. The knife member is moved to a raised, ring knifing position relative to the first slide member by the second slide member for engaging and removing a ring from a stack of rings disposed in the path of the raised knife member and positioning the removed ring in the first recess when the first slide member is moved in the first direction. The knife member is moved to a lowered position relative to the first slide member by the second slide member after the ring is positioned in the first recess so that the first slide member can be moved in the second direction to its starting position while avoiding the stack of rings.

In another embodiment of the invention, means is provided for positioning the ring expanding fingers within the ring residing in the recess. This means comprises a lift mechanism for raising the ring expanding fingers into the opening within the ring and for lowering the ring expanding fingers out of the opening after the ring is positioned in the piston groove.

In still another embodiment of the invention, the means for positioning the piston groove at the ring receiving position comprises a finger support member for supporting the ring expanding fingers in circumferential spaced apart relation about the axis and a plurality of piston locating members extending between the spaced apart ring expanding fingers for movement in unison therewith along the axis. The piston locating members initially support the piston to locate the piston groove out of alignment with the enlarged recess when the ring expanding fingers are engaged to the ring at the expanded positions. The finger support member is supported by spring means for movement relative to the enlarged recess in response to movement of the piston against the piston locating members. Stop means is effective to stop movement of the finger support member relative to the enlarged recess at a location where the ring expanding fingers are out of alignment with the enlarged recess and the piston groove is in alignment therewith to receive the ring therefrom.

Preferably, the piston locating members comprise radially inwardly extending flanges of a ring member disposed on the nest support member about the outer circumference of the ring expanding fingers.

The aforementioned objects and advantages of the present invention will become more readily apparent from the following detailed description of the invention taken with the following drawings.

DETAILED DESCRIPTION

Figure 1:
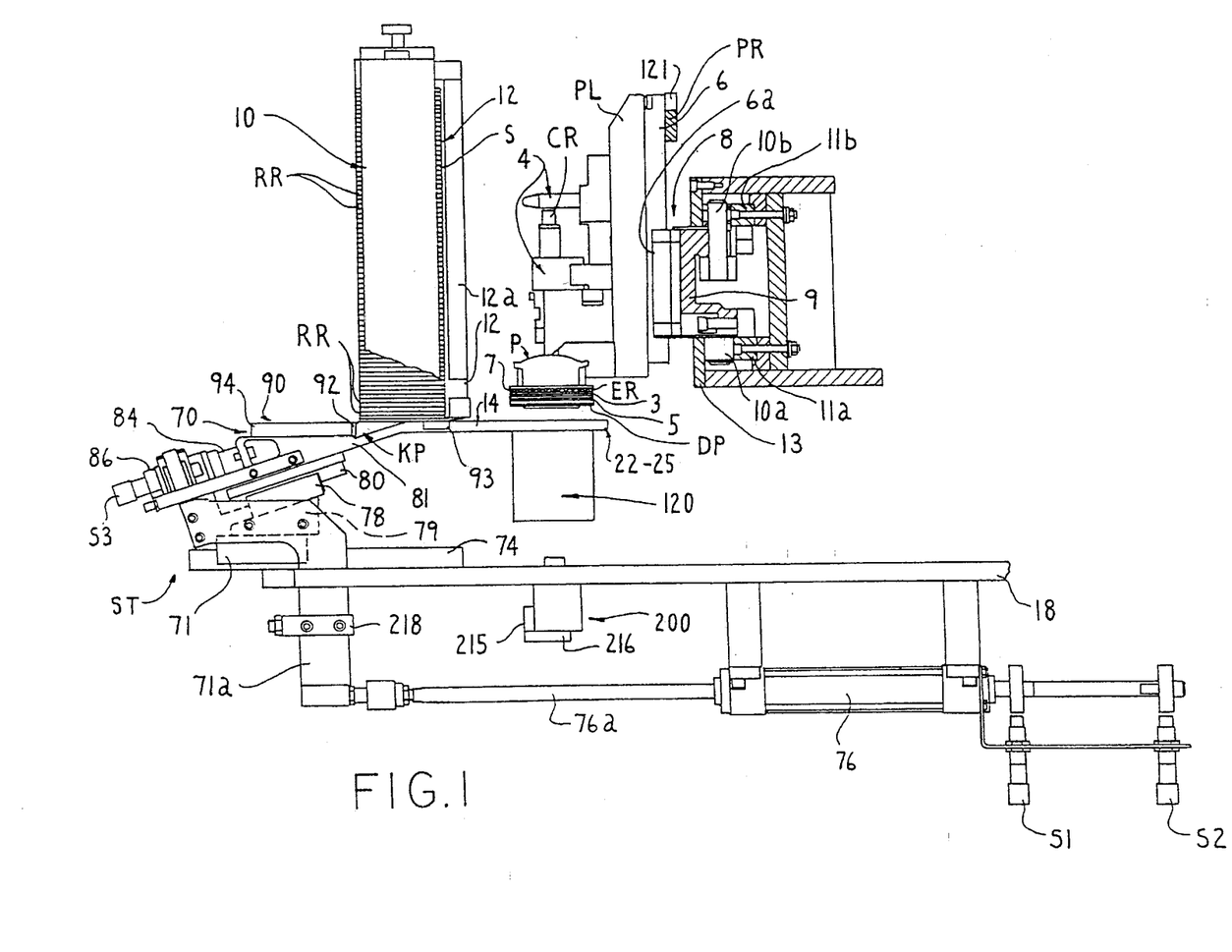
FIG. 1 is a side elevation of one embodiment of the apparatus of the invention for ringing a piston with some components shown schematically.
Figure 13:
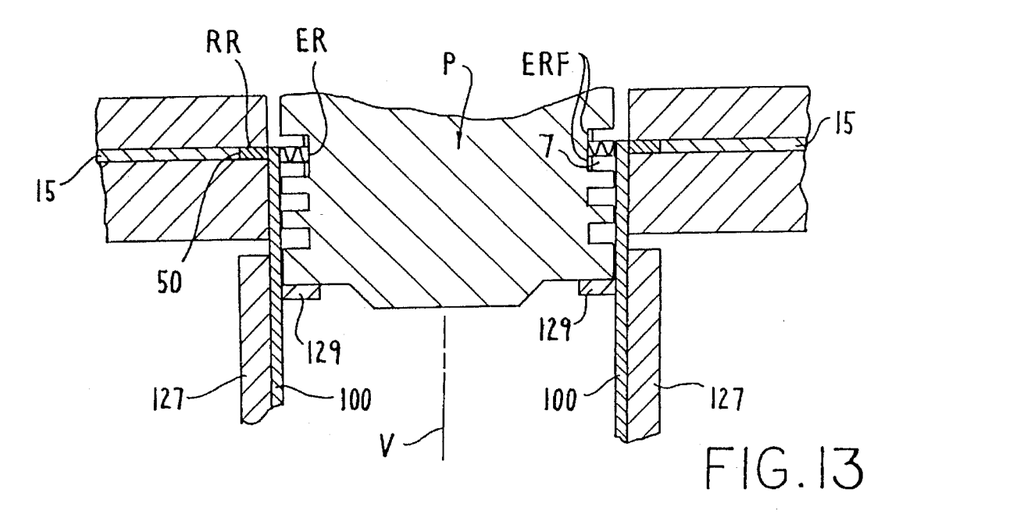
FIG. 13 is an enlarged view of the piston at a first location in the ring expanding finger assembly with the piston groove out of axial alignment with the ring recess.
Figure 14:
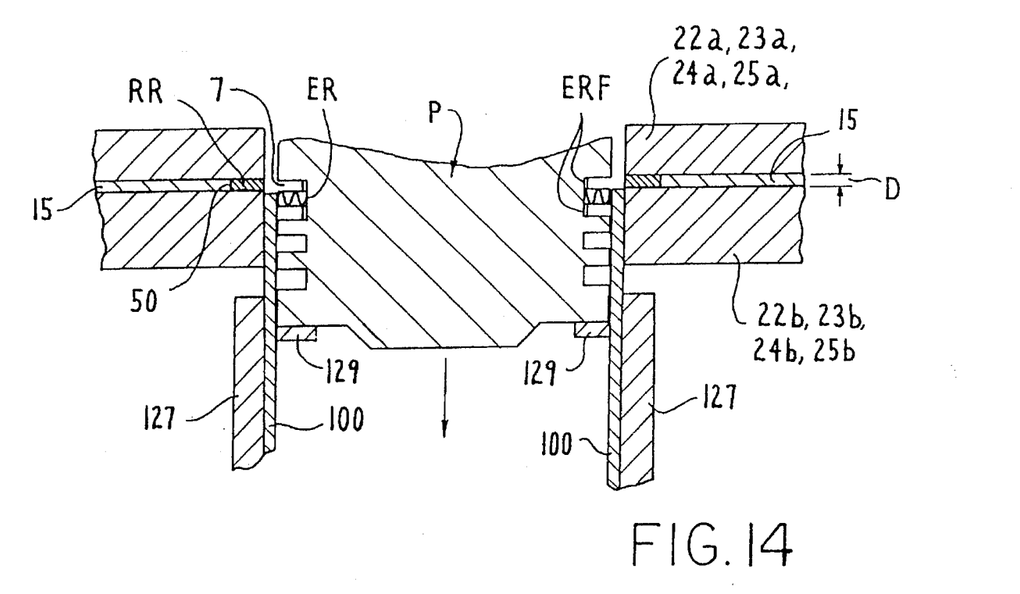
FIG. 14 is an enlarged view of the piston at a second, final location in the ring expanding finger assembly with the piston groove in axial alignment with the ring-receiving recess after axial piston movement has moved the ring expanding fingers axially downwardly out of alignment with the ring.

Referring to FIG. 1 and 13–14, a ringing apparatus (ringing station) in accordance with one embodiment of the invention is shown for assembling a thin so-called rail ring RR into an inner circumferential groove 7 of each of successive internal combustion engine pistons P (only one piston shown) on opposite sides of a corrugated expander ring ER previously assembled centrally in the groove 7. Although the invention is illustrated with respect to assembly of rail rings in a piston groove, the invention is not so limited and can be produced to install other types of rings, such as a compression ring, in a piston groove.

The rail rings typically comprise spring steel. Each piston P is fixtured by suitable fixture members 4 on a pallet PL that is mounted on a slide 6 that, in turn, is transported on a piston carousel 8. The fixture members engage and fixture the connecting rod CR connected to the piston P to position the piston P in an inverted orientation as shown.

Each slide 6 is attached via a slide bearing block a on a cast iron link or plate 9 that rides on cam followers 10a, 10b in a track formed between wear plates 11a, 11b and a housing 13 mounted on a suitable carousel structure 8a. The piston carousel 8 and carousel support structure 8a are conventional and available from Ferguson Machine Company, 11820 Lackland Road, St. Louis, Mo. 63146.

The piston carousel 8 traverses past the piston-ringing apparatus (station) shown in FIG. 1 via upper and lower cam followers 10a, 10b. Each slide 6 is movable downwardly to allow the piston thereon to be lowered to a first rail ringing apparatus for assembly of the first rail ring RR into the piston groove 7 on one side of the expander ring ER in manner to be described. Then, the piston P is moved to a second rail ringing apparatus like that used for assembly of the first rail ring RR for assembly of the second rail ring RR on the other side of the expander ring ER.

The corrugated expander ring ER (shown in FIGS. 13–14) is first assembled into the piston inner groove 7 using a ringing apparatus (station) described and shown in copending U.S. patent application (attorney docket number Micro-Precision 320) of common assignee herewith. Similarly, an intermediate cast iron compression ring (not shown) and an outermost cast iron or steel compression ring (not shown) can be assembled in the respective intermediate and outer piston grooves 3 and 5 using a ringing apparatus similar to that used for assembly of the expander ring ER with relatively minor modifications as described in aforementioned the copending, commonly assigned U.S. patent application (attorney docket number Micro-Precision 320).

Typically, each piston P/pallet PL is conveyed by the piston carousel 8 from one ringing apparatus (station) to another. The piston P/pallet PL is lowered via the slide 6 to the particular ringing station to this end. The pallet PL includes a rotatably mounted cam follower 121 that rides on a fixed rail PR above the carousel 8 to support the pallet PL in vertical orientation during transfer from one station to another. The rail PR is interrupted at each ringing station to allow lowering of the piston P/pallet PL via slide 6 at each station. In particular, at each ringing station, the slide 6 is transferred to a partial rail section (not shown) that is contiguous with rail PR and is lowerable/raiseable by a conventional pneumatic actuator (not shown) to effect piston ringing and then raising of the ringed piston for conveyance on rail PR to the next ringing station.

In particular, each piston P is conveyed first to an expander ringing apparatus (station) to assemble the expander ring ER in the inner piston groove 7, and then to first and second rail ringing apparatus (stations) in accordance with the present invention to assemble the rail rings RR on opposite sides of the expander ring ER. After the expander ring ER and rail rings RR are assembled in the inner piston groove 7, each piston P is conveyed by the carousel 8 and lowered via slide 6 to the intermediate ringing apparatus (station) to assemble the intermediate compression ring in the piston groove 3 and then to the outer compression ringing apparatus (station) to assemble the outer compression ring in the outer piston groove 5.

The aforementioned expander and compression ringing apparatus (stations) can be constructed differently from the rail ringing apparatus (station) in accordance with this invention since the rail ringing apparatus is used to assemble the much thinner rail rings in the piston groove 7 without ring "oil canning". The various expander, rail, and compression ringing apparatus (stations) are arranged and used in series relative to the piston carousel 8 in order to install the expander, rail, and compression rings in the piston grooves 3, 5, and 7. As mentioned above, the ringing apparatus of this invention can be used to assemble other types of rings, such as a compression ring, in a piston groove, however.

Referring now to the Figures, the ringing apparatus for assembling the first (upper) rail ring RR in the piston groove 7 on the upper side of the expander ring ER is shown. The apparatus for assembling the second (lower) rail ring ER on the lower side of the expander ring ER in groove 7 is identical with one minor exception to be explained below. As used here, the terms upper and lower are relative to the piston P while held in the inverted position shown.

Figure 2:
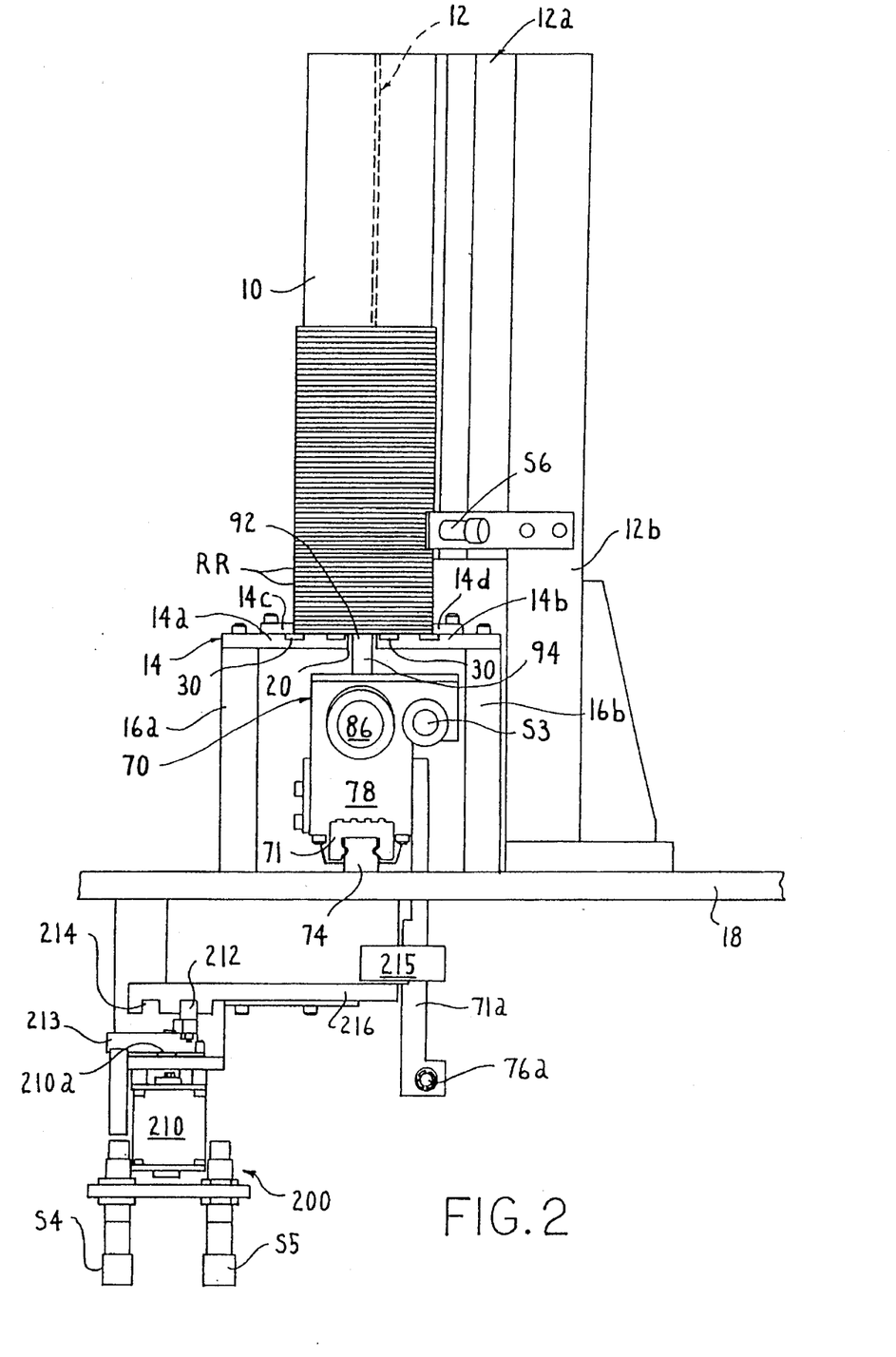
FIG. 2 is a front elevation of the apparatus of FIG. 1.
Figure 3:
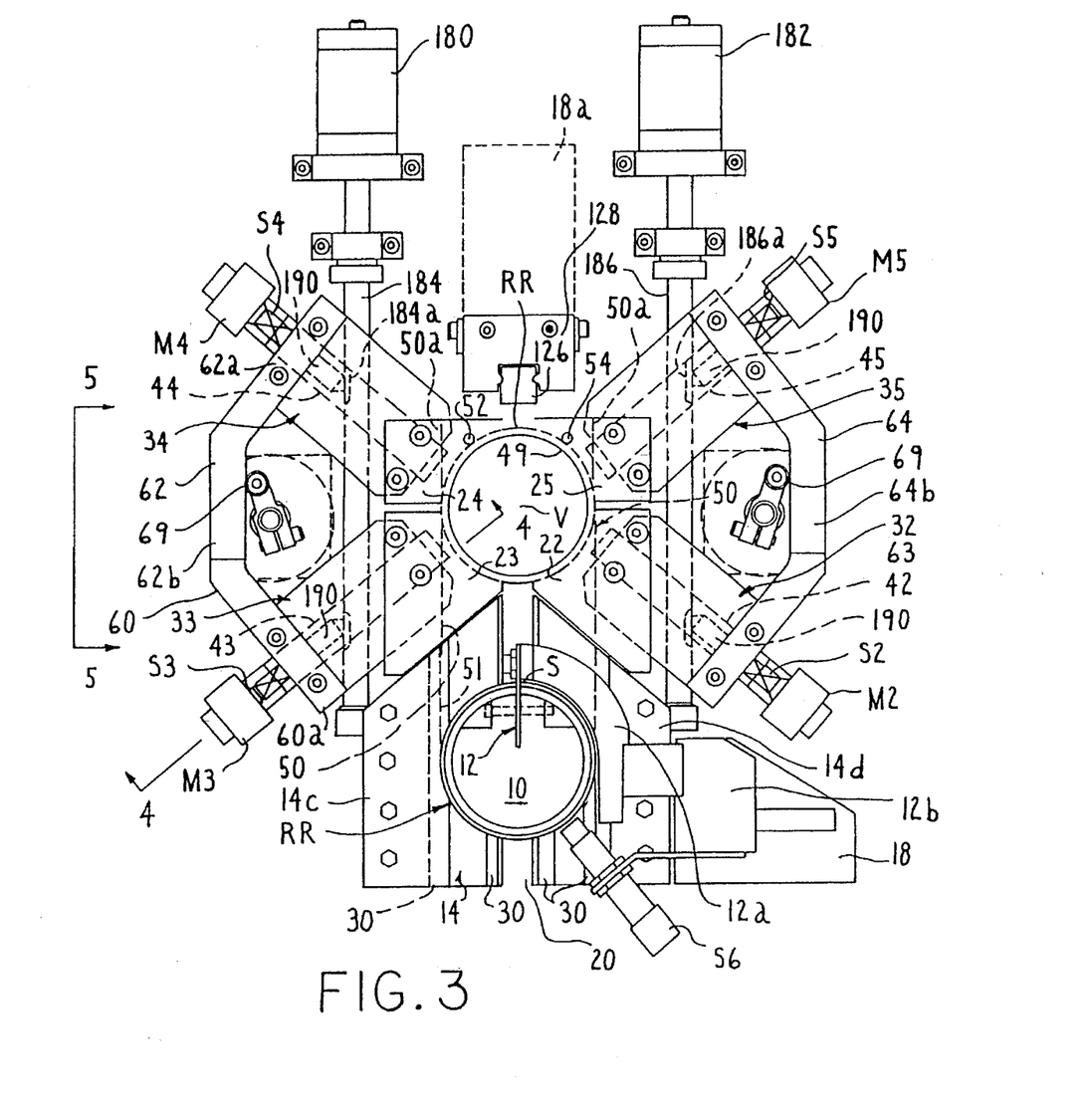
FIG. 3 is a plan view of the ring nest members (quadrant plates).

The rail ringing apparatus of the present invention comprises an upstanding, tubular ring supply cylinder 10 that is fixedly mounted by screws (one shown) to a slender vertical support vane 12 as shown best in FIGS. 2–3 via vane support arm 12a attached to post 12b on apparatus base 18. The cylinder 10 includes a plurality of rail rings RR stacked end-to-end thereon as shown partially in FIGS. 1–2. The vane 12 supports the bottom of cartridge 10 above a ring base 14 by the thickness of one rail ring RR.

The cylinder support vane 12 receives the rail rings RR at their slits S (FIG. 3) so that the rings RR are oriented in the same direction as they descend on the cartridge 10. The lowermost ring RR rests on the top surface of the base 14 (comprising left and right-hand plates 14a, 14b) overlying a gap 20 between the plates 14a, 14b. The elongated groove 20 extends diametrally relative to the rings RR as shown best in FIG. 3. The narrow support vane 12 also extends diametrally above the gap 20.

Each successive lowermost ring RR on the cartridge 10 is knifed laterally from the ring stack and transported to a plurality (four shown) of ring nest members 22, 23, 24, 25, FIG. 3. The base 14 includes four carbide inserts 30 on which each ring RR is slid to the nest members 22–25. The carbide inserts extend on the base 14 toward the nest members 22–25 to provide high wear resistant surfaces to resist wear and abrasion as the rings RR are transported from the cartridge 10 to the nest members 22–25.

The nest members 22–25 are supported on respective slides 32–35 that, in turn, are disposed on slideways 42–45 mounted on apparatus base 18. The nest members 22–25 are disposed in quadrants about a common vertical axis V for radial movement toward or away from the axis V between radially contracted positions (shown in FIG. 3) and radially expanded positions. The inner peripheries of the nest members 22–25 collectively form a circular opening 49 concentric (when viewed in plan) about the axis V when they are in the contracted positions shown in FIG. 3.

Figure 4:
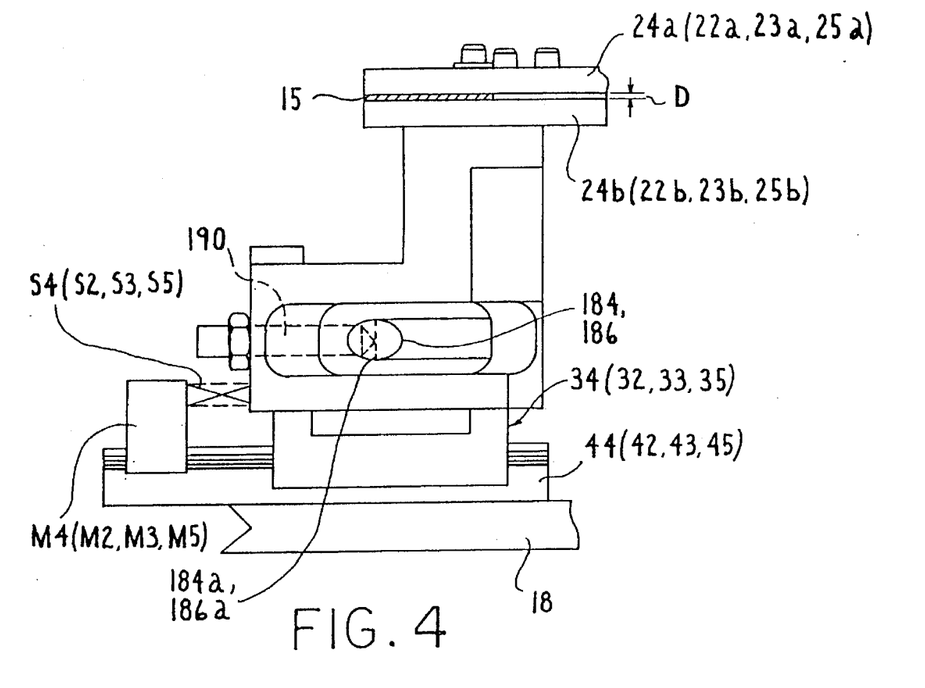
FIG. 4 is a view taken along lines 4—4 of FIG. 3.

As shown best in FIG. 4, each nest member 22–25 comprises first and second plates 22a, 22b; 23a, 23b; etc. spaced apart by a spacer 15 in the direction of the axis V so as to define a fixed axial dimension, D, therebetween. The nest members 22–25 are recessed as shown in FIG. 3 to form an elongated ring-receiving recess 50 having an open end facing the cartridge 10 and aligned with a channel 51 formed between other spacers (not shown but held between the base 14 and base cover plates 14c, 14d) to receive each ring RR transported from the cartridge 10 to the nest members when they are in the contracted positions of FIG. 4.

Each rail ring RR is positioned in the recess 50 concentric with axis V (see ring RR in FIG. 3) by a ring knife means 70 and knife stroke control mechanism 200 to be described below. The nest members 24 and 25 include ring stops 52, 54 that, together with the sidewalls 50a of the recess 50, help locate each ring RR received in the recess 50 concentric with the axis V; i.e. the vertical axis of each ring RR is coaxial with axis V as shown in FIG. 3, when the nest members are in the contracted positions. To this end, the ring stops 52, 54 are appropriately located on the circumference of an imaginary circle concentric with the outer circumference of the ring RR.

The axial dimension D of the ring-receiving recess 50 is selected (FIG. 4) just slightly greater than the thickness of the rail ring RR so as to prevent "oil canning" thereof during ring expansion as will be explained.

The ring nest members 22–25 are movable in unison from the radially contracted positions to radially expanded positions when the rail ring RR received in recess 50 is expanded concentrically about axis V so as to collectively form a second, radially larger circular opening for receiving the piston P to be ringed. In particular, the nest members 22–25 are biased by respective springs S2–S5 in a direction toward the axis V. As a result, radial expansion of the ring RR in the recess 50 causes the nest members 22–25 to expand radially outwardly in unison on slides 32–35, compressing the springs S2–S5. Springs S2–S5 are disposed between a respective fixed member M2–M5 and the respective slide 32–35, see FIG. 4 for spring S4.

When the rail ring RR is expanded, the expanded nest members 22–25 also inherently define a second enlarged recess that corresponds to recess 50 enlarged laterally by virtue of outward radial expansion of the nest members. The ring RR remains engaged to ring expansion fingers 100 to be described below to maintain the ring RR concentric with the axis V while the fixed axial dimension D prevents "oil canning" of the expanded ring.

Figure 5:
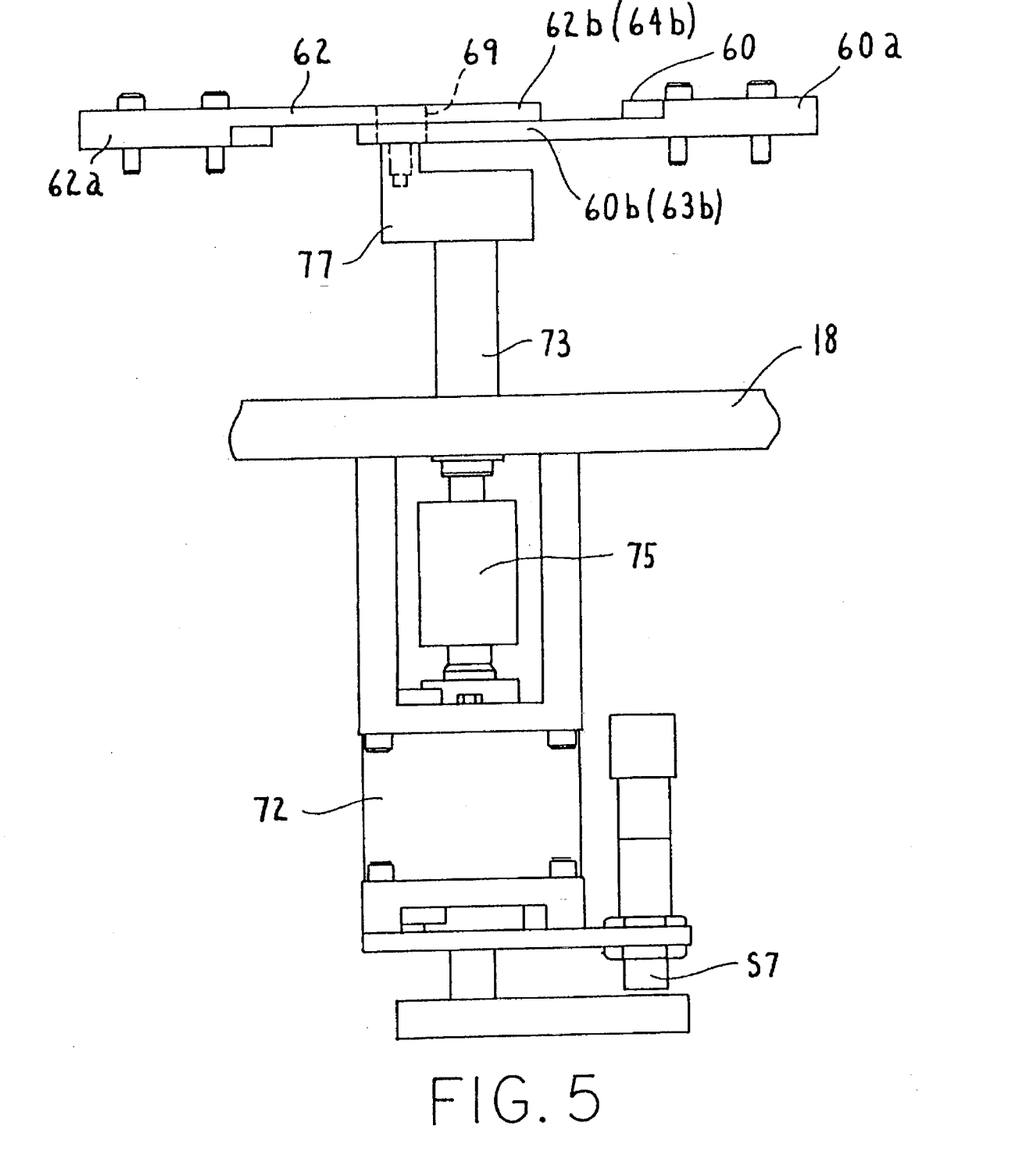
FIG. 5 is a view taken along lines 5—5 of FIG. 3.

As shown best in FIG. 3 and 5, the nest members 23 and 24 include respective arms 60, 62 and nest members 22 and 25 similarly include respective arms 63, 64. In particular, the arm 60 includes end 60a fastened to slide 33 and arm 62 includes end 62a fastened to slide 34. The arms 60, 62 have overlapping ends 60b and 62b. Similarly, nest members 22 and 25 have similar arms 63, 64 having similar ends 63a, 64a fastened to slides 32 and 35, respectively and overlapping ends 63b, 64b. A cam follower 69 on eccentric arm 77 and cam rotary actuator 72 are associated with each pair of overlapping arm ends 60b, 62b and 63b, 64b such that rotation of the cam followers 69 and arms 77 by the actuators 72 will cause the arms 60, 62 and 63, 64 to move outward and cause the nest members 22–25 to move outwardly on their slides 32–35 beyond the expanded positions after the ring RR is installed in the groove 7 of the piston P. This outward movement of the nest members 22–25 beyond the expanded positions permits ready removal of the ringed piston P as will be explained further below.

Each actuator 72 rotates a shaft 73 through a coupling 75. Each shaft 73 is connected to an eccentric arm 77 on which the cam follower 69 is disposed, FIG. 5.

Each lowermost rail ring RR is removed from the cartridge 10 and positioned in the recess 50 defined by the nest members 22–25 in their contracted positions shown best in FIG. 3. A ring knife means 70 is provided for movement in the groove 20 to this end and comprises a first slide member 71 (bearing blocks available from IKO International, Inc., 20-F Chapin Road, Pine Brook, N.J. 07058) reciprocable on slideway 74 (also available from IKO Corporation) from the start position ST in a first direction toward the first recess 50 and a second direction away from the first recess 50 back to the starting position ST. To this end, the slide member (bearing block) 71 is connected via bracket 71a to the rod 76a of pneumatic cylinder 76 mounted on the apparatus base 18. A riser member 79 having an inclined ramp is attached on slide member 71.

An intermediate bearing block 78 is fastened on the riser member 79. Movable on the bearing block 78 is a slideway 80 that is mounted to wedge 81 (slideway 80 and bearing block 78 comprising a second slide member). The slideway 80 thereby is inclined in a direction from the start position ST toward the recess 50 (i.e. oblique to the horizontal direction of movement of slide member 71). The wedge 81 is connected to the rod 84 of fluid cylinder 86 so as to be movable with slideway 80 on intermediate bearing block 78. The cylinder 86 is mounted fixedly on the first slide member (bearing block) 71.

Figure 6:
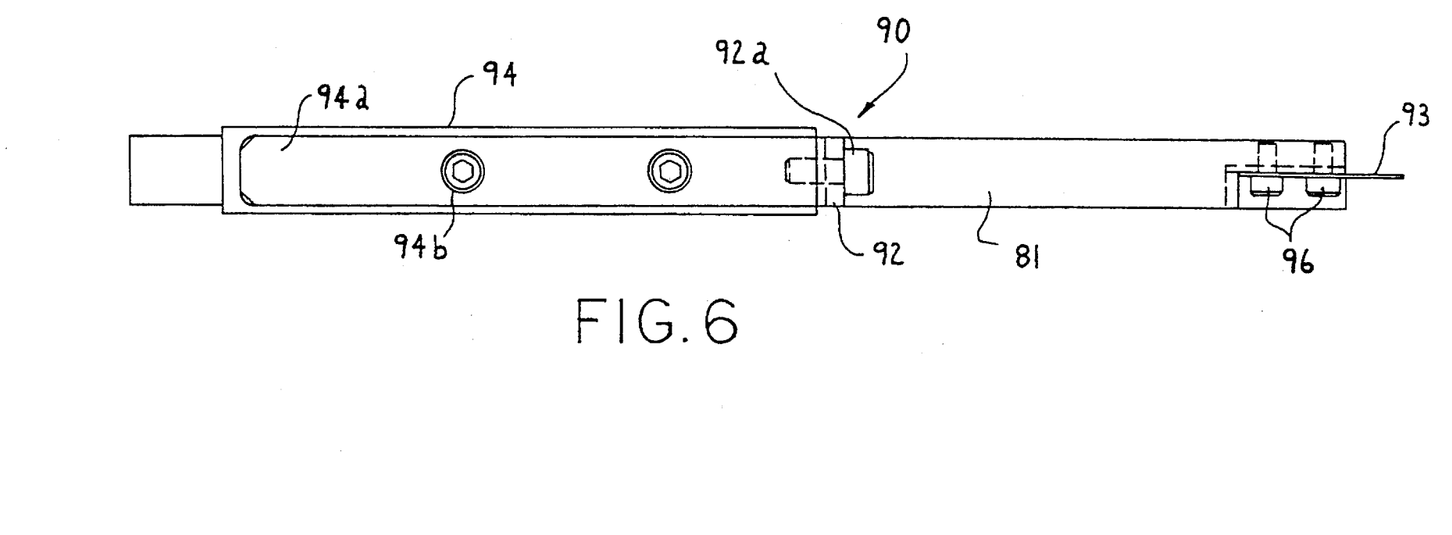
FIG. 6 is a plan view of the ring knife member.

A knife member 90, FIGS. 1 and 6, is disposed on the second slideway 80. The knife member 90 comprises a carbide insert 92 fastened by screw 92a to the knife extension 94, which contains a carbide wear strip 94a, the whole of which are attached to wedge 81 by screws 94b. A thin guide blade 93 is disposed forwardly of the insert 92. The knife member 90 is positioned to place the insert 92 in a raised, ring knifing position KP relative to the first slide member 71 in order to remove the lowermost rail ring RR from the cartridge during knife movement from the start position ST toward the nest members 22–25. The knife member 90 is raised relative to the first slide member 71 (bearing block) by movement of the wedge 81 using cylinder 86. That is, the cylinder 86 moves the wedge 81 and inclined slideway 80 to the raised, ring knifing position KP on intermediate bearing block 78.

In this position KP, the insert 92 of the knife member 90 will engage and remove the lowermost ring RR on the cartridge 10 when moved from the start position ST toward the nest members 22–25. That is, the lowermost rail ring RR is disposed between the bottom of the cartridge 10 and the base 14 in the path of the raised knife insert 92 as it is moved toward the nest members 22–25. The thin, elongated ring guide blade 93 is received in the slit S of each rail ring RR removed from the cartridge 10 to maintain the same ring orientation as present on the cartridge; i.e. the slit of the ring RR faces the recess 50 defined by the nest members 22–25. The guide blade 93 is fastened to the wedge 81 by screws 96.

The knife member 90 is moved by the cylinder 76 to a ring insertion position where the removed ring RR is positioned in the first recess 50 coaxial with the axis V defined collectively by the nest members 22–25 in the contracted positions. The ring insertion position is controlled by a stroke control mechanism 200 described below. The presence of a rail ring RR in the recess 50 for assembly in the piston groove 7 is verified by a fiber optic sensor 130 incorporated in nest member 23, FIG. 10.

Once the ring RR is positioned properly in the recess 50 and while residing at the recess 50, the knife member 90 is moved to a lowered position relative to the slide member (lower bearing block) 71 by movement of the wedge 81 using cylinder 86. Once the knife member 90 is so lowered, the cylinder 76 is actuated to return the knife member 90 to the start position ST. The knife member 90 is moved to a lowered position prior to actuation of cylinder 76 so that it can be returned to the start position ST without the insert 92 and guide blade 93 striking the bottom of the stack of rings RR on the cartridge 10. The above-described movement of the knife member 90 between the start position ST and the lowered position is repeated for each successive rail ring RR removed from the cartridge 10 and positioned in the recess 50. After each rail ring RR is positioned in the recess 50 in the manner described and shown best in FIG. 3, the ring RR is expanded to an enlarged radial size to receive the piston P and be installed in the piston groove 7.

Figure 10:
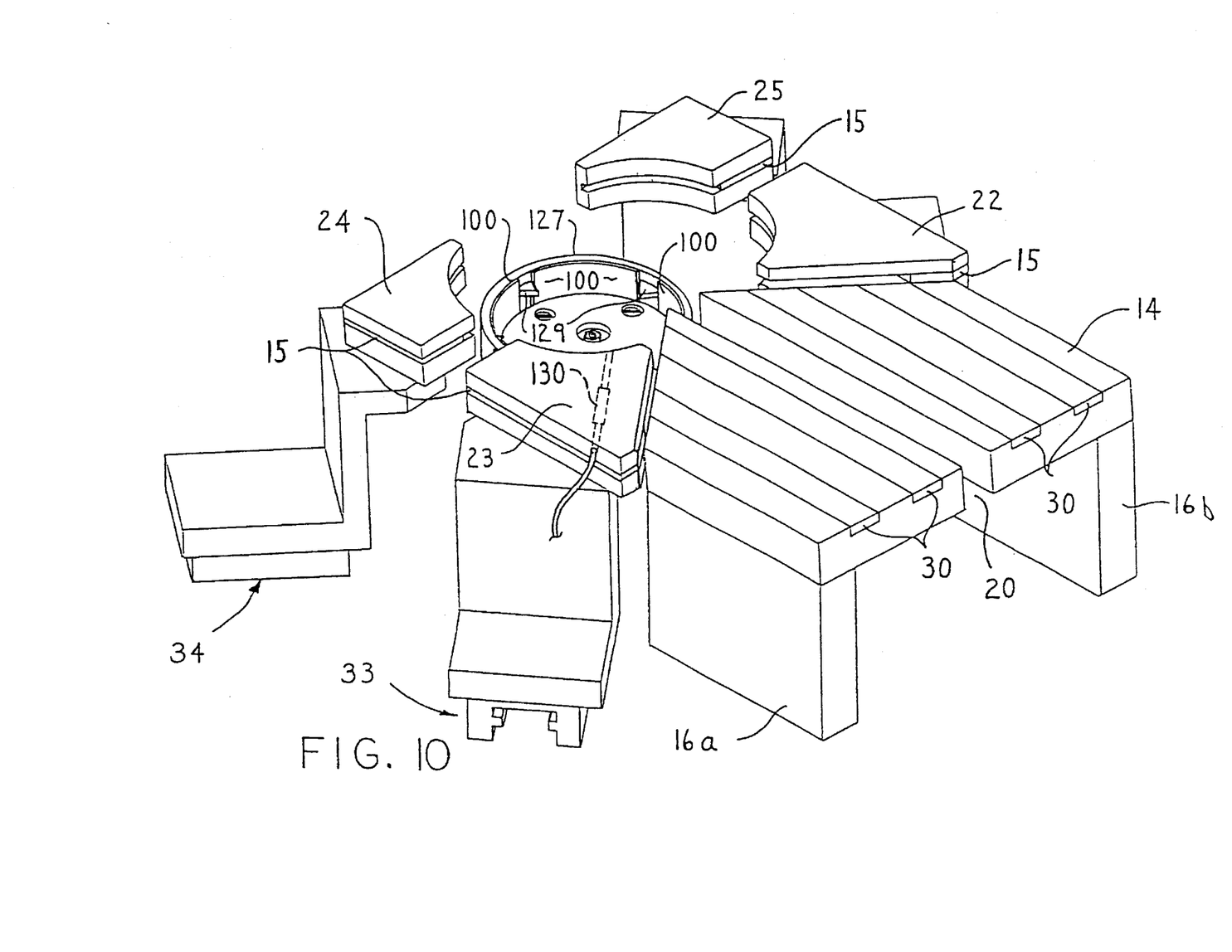
FIG. 10 is a perspective view of the ring expanding finger assembly with the nest members expanded.
Figure 11:
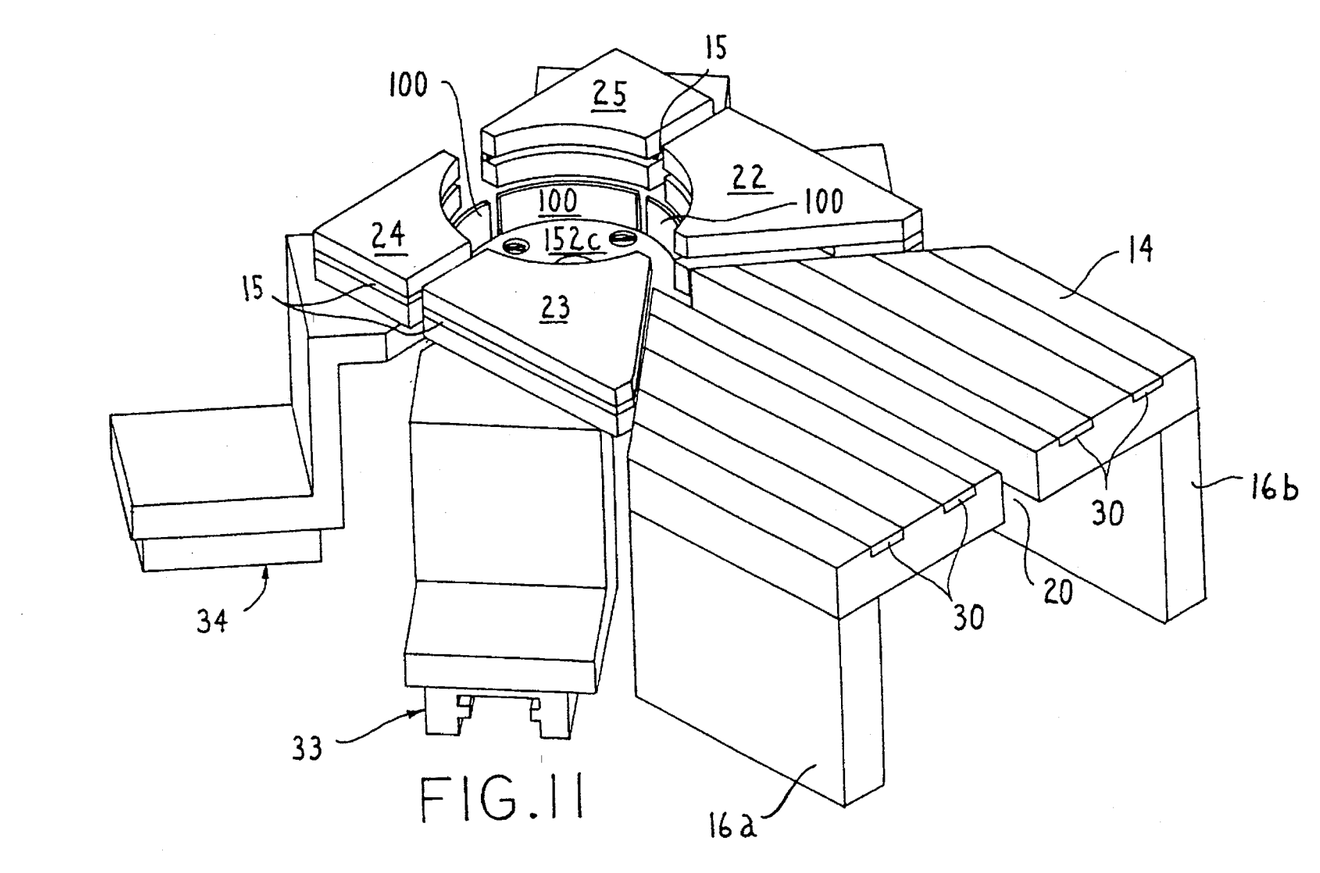
FIG. 11 is a perspective view of the contracted nest members and ring expanding finger assembly for receiving an unexpanded rail ring.

To this end, the ringing apparatus of the invention includes a plurality of thin circumferentially spaced apart ring expanding fingers 100 disposed concentrically about the axis V, FIGS. 10–11. The expanding fingers 100 initially are disposed below the nest members 22–25 concentric with the first circular opening 49. The expanding fingers 100 are positionable in the first circular opening 49 for radial movement in a manner to engage and expand the ring RR while it resides in the recess 50. The fingers have a circular arc profile to facilitate engagement and expansion of the ring RR in the recess 50.

Figure 12:
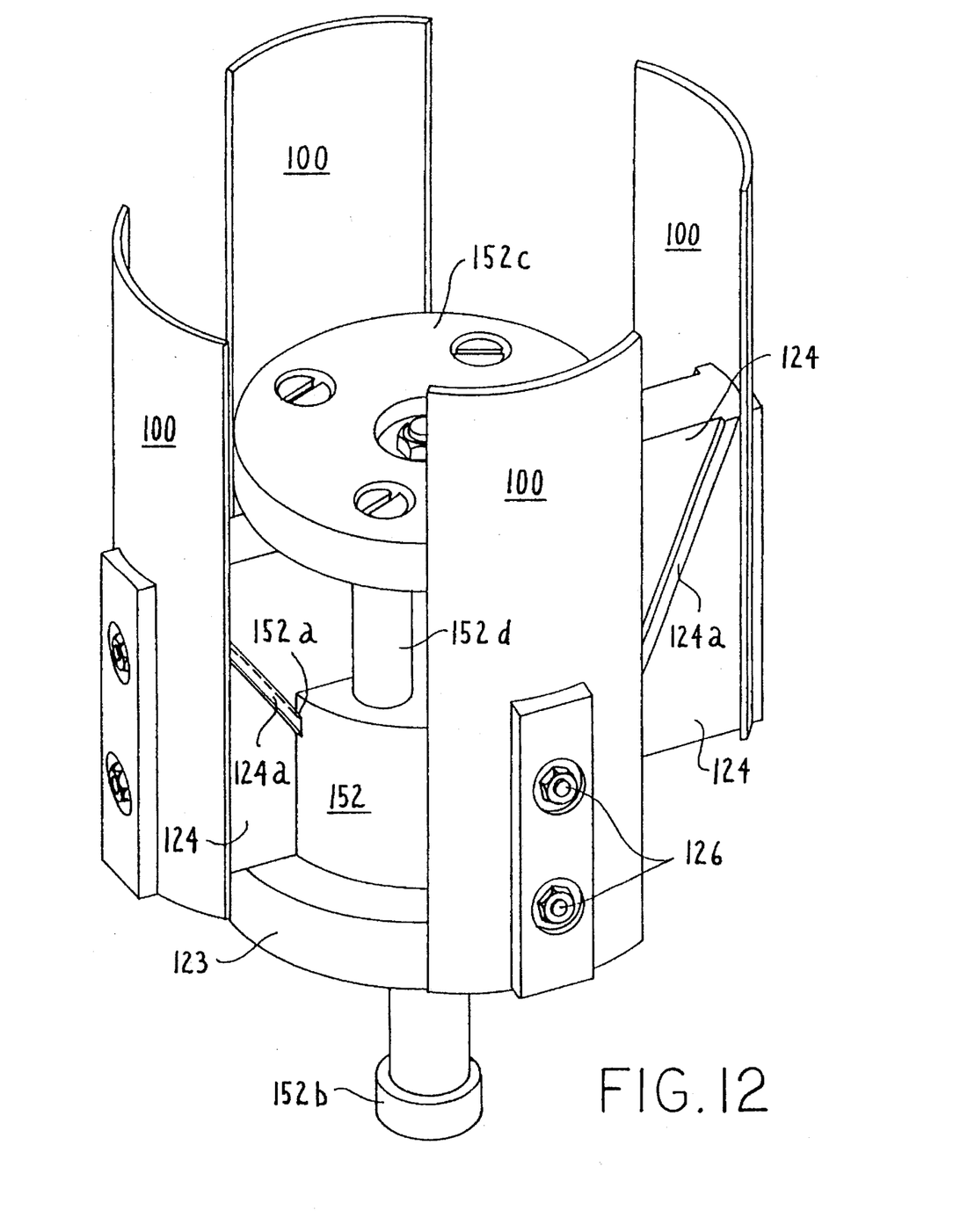
FIG. 12 is a perspective view of the ring expanding fingers and cam expanding mechanism.

The ring expanding fingers 100 are disposed on a movement mechanism 120 (shown schematically in FIG. 1) that is operative to raise/lower the fingers 100 relative to the recess 50 and the ring RR residing therein and also to radially expand/contract the fingers 100 relative to the axis V. The mechanism 120 includes finger support members 122, 123 on which four finger support blocks 124 are circumferentially disposed for radial sliding movement by cam action, FIGS. 7 and 12. Each finger 100 is fastened to a respective block 124 by screws 126 as shown best in FIG. 12.

Figure 9:
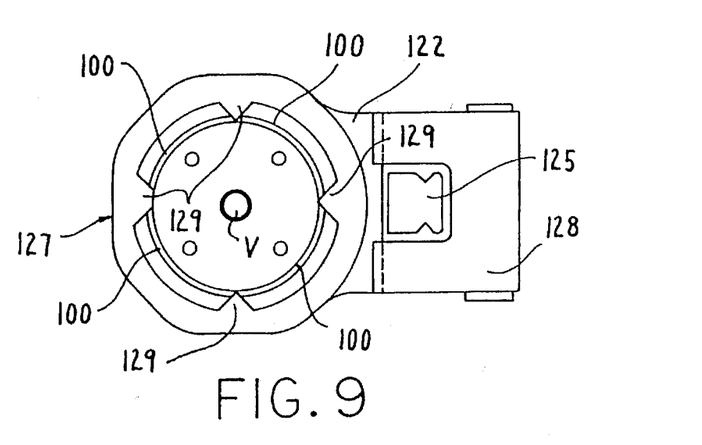
FIG. 9 is a plan view of the ring expanding finger assembly of FIG. 7.

A locating annulus 127 is fixedly disposed on the finger support member 122 and includes a plurality of piston locating extensions or flanges 129 that extend radially inward between the spaced apart ring expanding fingers 100 as shown best in FIGS. 9 and 10. Since the fingers 100 and the annulus 127 are mounted on the support member 122, they move in unison therewith along the axis V. As will be explained below, the piston locating flanges 129 initially support the piston P to locate the piston groove 7 out of alignment with the expanded ring RR residing in the enlarged second recess defined by the expanded nest members 22–25.

The finger support member 122 is disposed on a vertical slide member 125 that is attached on a vertical slideway 126 which is disposed in a bearing block 126a for movement in an up/down manner. The bearing block 126a is mounted on a frame 128 mounted on apparatus base 18. Beneath the vertical slide member 125 is a stop member 130 on a lift plate 142 and disposed to slide along the vertical slideway 126 by means of a second bearing block 126b. The stop member 130 is held in an adjusted or selected position by bracket 131 and adjusting screw 133, FIG. 8.

The slide member 125 is separated from the stop member 130 by a pair of springs 132 that bias the slide member 125 in an upward direction to locate the fingers 100 in an initial, predetermined position relative to the recess 50 and the unexpanded rail ring RR therein. In effect, the finger support member 122 is positioned a predetermined distance X above the stop member 130 such that the finger support member 122 can be moved downwardly a predetermined distance until it abuts the stop member 130.

Figures 7, 8:
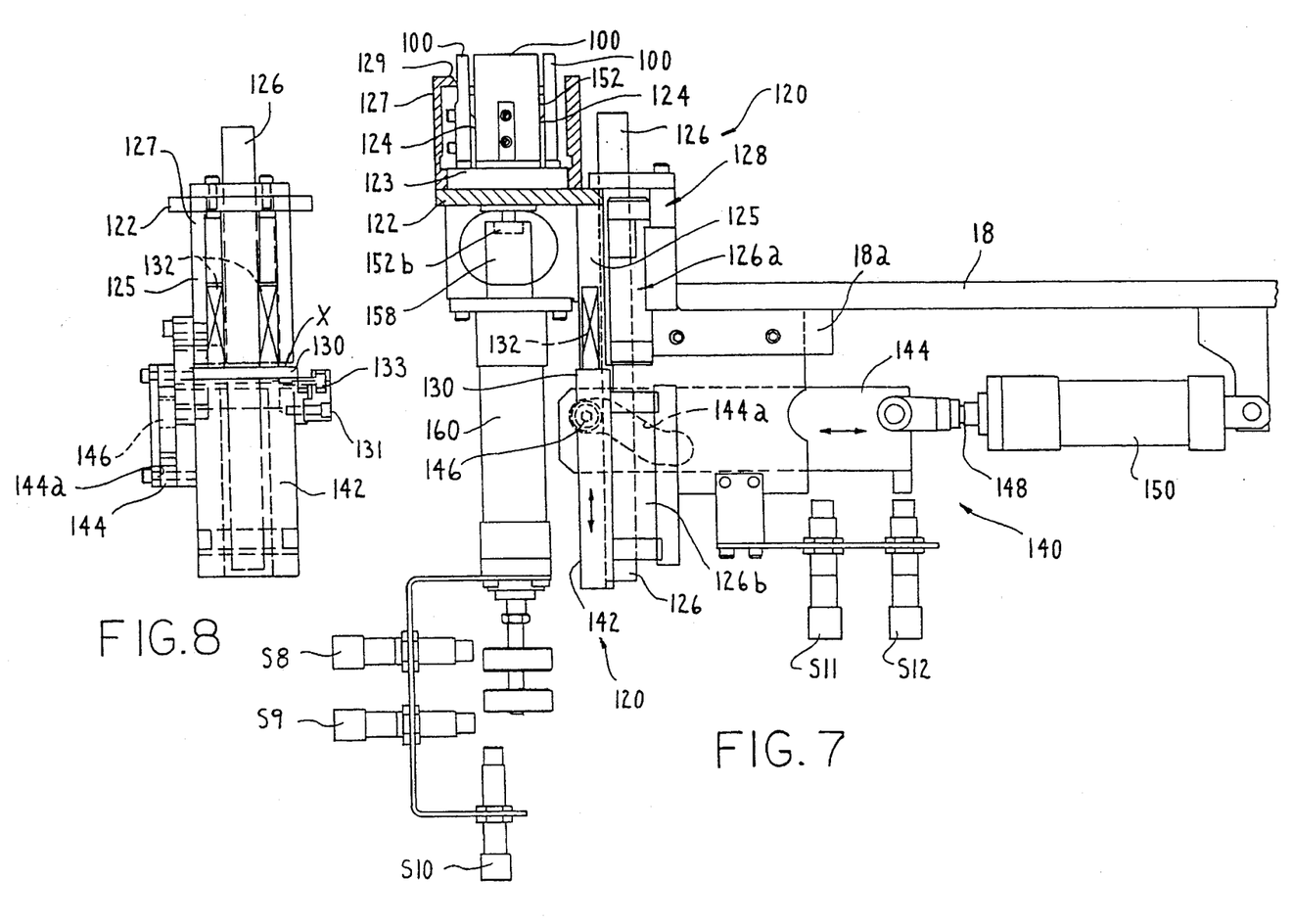
FIG. 7 is a side elevation of the ring expanding finger mechanism.
FIG. 8 is a front view of the ring expanding finger mechanism of FIG. 7.

The slide member 125 is moved vertically up/down by a lift member 140 comprising a lift plate 142 disposed beneath the slide member 125 on slideway 126, a cam follower 146 attached to the lift plate 142, and a cam track 144a in a cam plate 144 disposed in a slide mounted to the frame 128 mounted on apparatus base 18 and bracket 18a, as shown best in FIGS. 7 and 8. The cam plate 144 and its cam track 144a are moved past the cam follower 146 by the rod 148 of a pneumatic cylinder 150 disposed on a frame mounted on apparatus base 18.

As the cam plate 144 and cam track 144a are moved horizontally, the cam follower 146 rides in the cam track 144a and moves the attached lift plate 142 vertically. Movement of the cam plate 144 and cam track 144a to the right in FIG. 7 raises the finger support member 122 and the fingers 100 thereon into the opening 49 with the ring RR residing in recess 50. Movement of the cam plate to the left in FIG. 7 lowers the finger support member 122 and fingers thereon out of the ring RR and the opening 49.

As mentioned above, the ring expanding fingers 100 are also disposed for radially outward/inward movement relative to axis V. In particular, referring to FIGS. 7–8 and 12, the fingers 100 are mounted on finger support blocks 124 each including a cam rail 124a that inclines from the center toward the circumference of the circular block array. Each cam rail 124a is adapted to be engaged by camming surface 152a of cam member 152 centrally disposed of the fingers 100. That is, the cam member 152 is movable on an axis that is coaxial with the axis V. The cam member 152 is movable along axis V via an axial, knobbed shank 152b that is connected to a rod coupling 158 of fluid cylinder 160, FIG. 7.

Movement of the cam member 152 downwardly along the axis V by actuation of cylinder 160 is guided by bearing posts 152d (one shown) between upper plate 152c and cam member 152. This causes the blocks 124 to be cammed and moved in unison radially outward to expand the fingers 100 against the bias of springs 62–65 of the nest members 22–25. Movement of the cam blocks 152 upwardly along the axis V contracts the blocks 124 radially inward in unison to return the fingers 100 to the initial contracted positions. When the blocks 124 are fully contracted, there is clearance between the fingers 100 and the nest members 22–25, which stop against the rods 184, 186, FIG. 3.

Thus, the ring expanding fingers 100 are raised/lowered and radially expanded/contracted relative to the recess 50 and the unexpanded rail ring RR residing in the recess 50.

The apparatus includes means for positioning the piston groove 7 at a ring receiving position relative to the expanded ring RR residing in the enlarged recess 50 formed by the expanded nest members 22–25. In particular, as mentioned, the locating annulus 127 (fixedly disposed on the finger support member 122) includes a plurality of piston locating extensions or flanges 129 that extend radially inward between the spaced apart ring expanding fingers 100 as shown best in FIGS. 9 and 10. The fingers 100 and the annulus 127 are movable in unison along axis V as a result of being mounted on the support member 122.

The piston P is lowered along axis V with the dome end DP facing down to position the dome end DP in the enlarged recess 50 (defined by the expanded nest members 22–25) in engagement with the locating flanges 129 as illustrated in FIG. 13. As shown, this engagement initially locates the piston groove 7 above and out of axial alignment with the expanded ring RR residing in the enlarged recess 50. As is apparent, the bottom of the groove 7 formed by the expander ring ER is level (coplanar) with the upper ends of the fingers 100.

Lowering of the piston P is continued along axis V as illustrated in FIG. 14 with the piston dome DP engaged to the flanges 129. This movement causes the fingers 100 to move downwardly relative to the enlarged recess 50 by a distance equal to piston movement since the fingers 100 and flanges 129 are disposed on the movable support member 122. The support member 122 moves downward on slide 125 against the bias of springs 132 until the slide 125 abuts or engages the stop member 130. Downward movement of the piston groove 7 and the fingers 100 relative to the expanded ring RR residing in the enlarged recess 50 is thereby controlled by the position of the stop member 130 relative to the slide 125. This distance X is predetermined to axially align the upper ends of the fingers 100 with the bottom of the enlarged recess 50 of the expanded quadrant plates 22–25 so that the recess 50 and expanded ring RR therein, in effect, communicate to the piston groove 7 and allow the expanded ring RR to snap into the now axially aligned groove 7 above the expander ring ER already in the groove 7. This axial alignment is shown in FIG. 14.

After the ring RR snaps into the piston groove 7, the rotary actuators 72 are actuated to move cam followers 69 relative to the overlapping arm ends 60b, 62b and 63b, 64b such that the arms 60–64 move outward and cause the nest members 22–25 to move outwardly on their slides 32–35 beyond the expanded positions. This outward movement of the nest members 22–25 beyond their expanded positions permits ready removal of the ringed piston P from the nest members 22–25 by upward movement of slide 6.

After the ringed piston is removed from the ringing apparatus, the cylinder 160 is actuated to raise the cam member 152 and rotary actuators 72 are actuated to disengage the cam followers 69 from the arms 60, 62, 63, 64. This allows the expanding fingers 100 to be moved radially inwardly by the spring biased nest members 22–25 to the original contracted positions. The cylinder 150 then is actuated to move the cam plate 144 to the lower position of the groove 144a so as to lower the finger support member 122 relative to the now contracted ring receiving recess 50. The fingers 100 are thereby lowered out of the opening 49 formed by the nest members 22–25.

The knife member 90 then is moved to the raised position KP relative to the first slide member (lower bearing block) 71 by movement of the wedge 81 using the cylinder 86. The knife member 90 thus is positioned to remove the next lowermost unexpanded rail ring RR residing at the bottom of the cartridge 10 for positioning in the recess 50 of the radially contracted nest members 22–25. Once positioned in the recess 50, the ring RR is expanded and assembled in the groove 7 of the next piston P in the manner described above.

Figure 15:
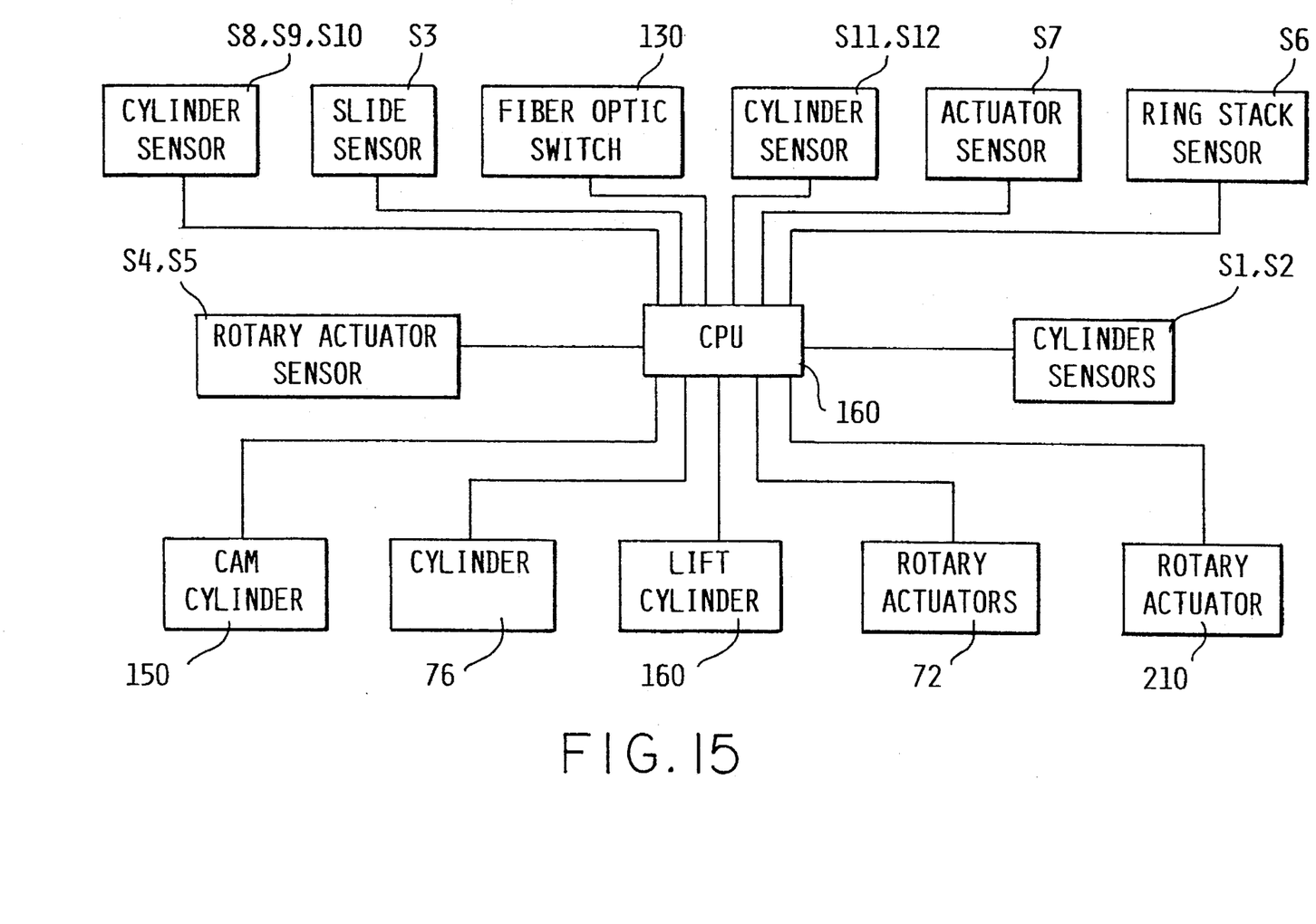
FIG. 15 is a diagrammatic view of the control system of the piston ringing apparatus of FIG. 1.

A computer control unit 160, FIG. 15 is provided to control the ringing apparatus described in response to suitable position feedback sensors S1–S12 associated with the cylinders/actuators described above. The control unit 160 provides the desired automated sequential control of the apparatus components to effect ringing of successive pistons P in the manner described above.

As mentioned above, each piston P is conveyed by the carousel 8 to a succession of ringing apparatus (stations) to assemble the expander ring ER and rail rings RR in the inner piston groove 7 on opposite sides of the expander ring which is centered in the groove 7 by axial projections ERF thereof as shown in FIGS. 13–14. The upper rail ring RR is first positioned in the piston groove 7 using the ringing apparatus described above. The term "upper" is used here with respect to the piston P inverted for ring assembly. This rail ring actually is below the expander ring when the piston is assembled in the engine.

A similar ringing apparatus is used to position the lower rail ring in the piston groove 7 above the expander ring ER. The term "lower" is used here with respect to the inverted piston P. This rail ring actually is above the expander ring when the piston is assembled in the engine.

The ringing apparatus for the lower rail ring differs only in using locating flanges 129 and stop member 130 selected to locate the bottom of the groove 7 level (coplanar) with the upper ends of the fingers 100 when the piston dome PD initially engages the locating flanges 129 and then to axially align the upper ends of the fingers 100 with the bottom of the recess 50 when the support member 122 abuts the stop member 130 so that the recess 50 and expanded ring RR therein, in effect, communicate to the piston groove 7 below the expander ring ER and allow the expanded ring RR to snap into the now axially aligned groove 7 below the expander ring ER. Otherwise, the ringing apparatus for installing the upper and lower rail rings in the piston groove 7 on opposite sides of the expander ring ER are the same in construction and function.

The ringing apparatus described above can be modified to install larger diameter rail rings on larger diameter pistons. For example, an arcuate partial sleeve (not shown) can be fastened to the cartridge 10 to enlarge the effective cartridge diameter to accommodate larger diameter rail rings. Moreover, the nest members 22–25 can be repositioned to different initial contracted positions that, in effect, provide a larger ring-receiving recess 50 For the larger piston. To this end, rotary actuators 180, 182 are provided to rotate adjusting rods 184, 186 associated with the nest members as shown in FIGS. 3–4. The adjusting rods 184, 186 have flats 184a, 186a thereon. Screws 190 are provided on the slides 32–35 for engaging either the flats on the respective rods 184, 186 or the full diameter thereof. When the screws 190 are engaged on the full diameter of the rods 184, 186, the nest members 22–25 are positioned on slides 32–35 farther radially outward concentrically about the axis V to provide a larger opening 49 and recess 50 appropriate for the larger diameter rail rings. When the actuators 180, 182 are actuated to rotate the rods 184, 186 to engage the flats 184a, 186a and the adjusting screws 190, the nest members 22–25 are positioned on slides 32–35 radially inward about the axis V to provide a smaller diameter opening 49 and recess 50 appropriate for smaller diameter rail rings.

A stroke adjustment mechanism 200, FIGS. 1–2 (shown partially in FIG. 1), is provided for the knife member movement mechanism to control the stroke of the rod 76a of the cylinder 76 in a manner that the larger diameter rail ring will be positioned in the recess 50 concentric about the axis V.

The mechanism 200 includes a rotary actuator 210 to rotate an arm 213 and cam follower 212 on the arm 213. The cam follower 212 travels in a rectangular notch 214 in a slide plate 216 and eccentric with the rotational axis of the actuator shaft 210a. Movement of the cam follower 212 eccentrically slides the plate 216 to the left (to accommodate a small rail ring; e.g. 82 mm outer diameter) or right (to accommodate a larger rail ring; e.g. 90 mm outer diameter) in FIG. 2. In one control mode, the slide plate 216 positions a stroke control flange 215 fastened on the plate 216 in the path of a stop bracket 218 of the bracket 71a to abut the bracket 218 to provide a particular ring insertion position for larger diameter rail rings. Eccentric movement of the cam follower 212 is controlled to slide the slide plate 216 to withdraw the stroke control flange 215 out of the path of the rod bracket 218 to provide a second ring insertion position for the smaller diameter rail rings to insure each ring is positioned in the recess 50 concentrically of the axis V.

To expand the fingers 100 farther radially outward to expand the larger diameter rail ring to an expanded size appropriate for a larger diameter piston, a larger diameter annulas 127 is installed prior to ringing the larger pistons. Since the fingers 100 expand until they abut the inner diameter of the annulus 127, this provides a positive stop, whereby the cylinder 160 never reaches the end of its stroke.

Since the nest members 22–25 are carried on the slides 32–35, they can expand radially with the ring residing in the recess 50 sufficiently to accommodate its expansion to enlarged assembly size. The rotary actuators 72 and cam followers 69 provide enough stroke to expand the rest members 22–25 for clearing either a small or large size piston and rings assembled thereon. No adjustment thereof is required.

After each piston P is conveyed to the expander ringing apparatus (station) and rail ringing apparatus (stations) to install the rings ER and RR into the piston groove 7, each piston P is then conveyed to ringing stations to install the intermediate compression ring in the intermediate piston groove 3, and the outer compression ring (not shown) in the outer piston groove 5. As mentioned above, the aforementioned expander ringing apparatus and compression ringing apparatus are different in construction from the rail ringing apparatus in accordance with the present invention. The compression and expander ringing apparatus (stations) thus form no part of this invention, although the various expander, rail, and compression ringing apparatus (stations) are arranged and used in series relative to the piston carousel 8 in order to install the expander, rail, and compression rings in the piston grooves 3, 5, and 7. The expander and compression ring ringing apparatus (stations) are described and shown in copending U.S. patent application (attorney docket number Micro-Precision 320) of common assignees herewith.

Although certain specific features and embodiments of the invention have been described hereinabove and shown in the drawings, it is to be understood that modifications and changes may be made therein without departing from the spirit and scope of the invention as defined in the appended claims.

The embodiments of the invention in which an exclusive property or privilege is claimed are defined as follows:

1. A method of positioning a ring in a circumferential piston groove, comprising:

disposing a plurality of radially movable ring nest members about a common axis to collectively form a circular opening concentric about said common axis and a ring-receiving recess concentric about said opening, said recess having a radial dimension for receiving and locating a radially unexpanded ring concentric with said common axis, positioning an unexpanded ring in the recess to locate said ring concentric with said common axis, disposing a plurality of ring expanding fingers in said opening about said common axis and within the ring residing in said ring-receiving recess, said ring expanding fingers being disposed in axially opposing relation to the recess and an inner periphery of the ring residing in said recess, moving the ring expanding fingers radially outward to engage the inner periphery of the ring to expand said ring and move said ring nest members radially outward so as to collectively enlarge said opening for receiving the piston and said recess to maintain the expanded ring concentric with said common axis, and positioning the piston in the enlarged opening in a manner that the ring expanding fingers are moved axially out of opposing relation to the enlarged recess in response to said piston movement and said piston groove is moved to a ring receiving position opposing the enlarged recess so as to allow the expanded ring to enter said piston groove therefrom.

2. The method of claim 1 including axially confining the ring in said recess to prevent "oil-canning" of the ring when it is expanded.

3. The apparatus of claim 1 wherein the piston groove is moved to the ring receiving position by inserting the closed end of the piston in the enlarged opening to engage support means on which the ring expanding fingers are disposed and move said support means and fingers thereon out of axially opposing relation with the enlarged recess while said piston groove is moved into alignment with the enlarged recess so as to receive the ring therefrom.

4. A method of positioning a ring in a circumferential piston groove, comprising:

disposing a plurality of radially movable ring nest members about a common axis to collectively form a circular opening concentric about said common axis and a ring-receiving recess concentric about said opening, said recess having a radial dimension for receiving and locating a radially unexpanded ring concentric with said common axis, positioning an unexpanded ring in the recess to locate said ring concentric with said common axis, disposing a plurality of ring expanding fingers in said opening about said common axis while the ring resides in said recess, said ring expanding fingers being disposed in opposing relation to the recess, moving the ring expanding fingers radially outward to expand said ring while axially confining the ring in said recess in a manner to prevent "oil-canning" of the ring when it is expanded and move said ring nest members radially outward so as to collectively enlarge said opening for receiving the piston and said recess to maintain the expanded ring concentric with said common axis, and positioning the piston in the enlarged opening in a manner that the ring expanding fingers are moved axially out of opposing relation to the enlarged recess in response to said piston movement and said piston groove is moved to a ring receiving position opposing the enlarged recess so as to allow the expanded ring to enter said piston groove therefrom.

5. A method of positioning a ring in a circumferential groove of member, comprising:

disposing a plurality of radially movable ring nest members about a common axis to collectively form a circular opening concentric about said common axis and a ring-receiving recess concentric about said opening, said recess having a radial dimension for receiving and locating a radially unexpanded ring concentric with said common axis, positioning an unexpanded ring in the recess to locate said ring concentric with said common axis, disposing a plurality of ring expanding fingers in said opening about said common axis and within the ring residing in said ring-receiving recess, said ring expanding fingers being disposed in opposing relation to the recess and an inner periphery of the ring residing in said recess, moving the ring expanding fingers radially outward to engage the inner periphery of the ring to expand said ring and move said ring nest members radially outward so as to collectively enlarge said opening for receiving the member and said recess to maintain the expanded ring concentric with said common axis, and positioning the member in the enlarged opening in a manner that the ring expanding fingers are moved axially out of opposing relation to the enlarged recess in response to movement of said member and said groove is moved to a ring receiving position opposing the enlarged recess so as to allow the expanded ring to enter said groove therefrom.

\* \* \* \* \*